United States Patent
Kilmer et al.

(10) Patent No.: US 8,438,226 B2
(45) Date of Patent: May 7, 2013

(54) DYNAMIC ADJUSTMENT OF USER-RECEIVED COMMUNICATIONS FOR A REAL-TIME MULTIMEDIA COMMUNICATIONS EVENT

(75) Inventors: Malcolm W. Kilmer, Research Triangle Park, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/820,872

(22) Filed: Jun. 22, 2010

(65) Prior Publication Data

US 2011/0314394 A1 Dec. 22, 2011

(51) Int. Cl.
  G06F 15/16 (2006.01)
  G06F 3/00 (2006.01)
  H04N 7/14 (2006.01)

(52) U.S. Cl.
  USPC .................. 709/204; 348/14.08; 715/756

(58) Field of Classification Search .................. 709/204; 348/14.08–14.1; 715/753, 756
  See application file for complete search history.

(56) References Cited

U.S. PATENT DOCUMENTS

| | | | |
|---|---|---|---|
| 7,512,698 B1 | 3/2009 | Pawson | |
| 7,571,246 B2 | 8/2009 | Virdi et al. | |
| 7,701,884 B2 | 4/2010 | Chapweske et al. | |
| 8,208,000 B1* | 6/2012 | Swanson et al. | 348/14.08 |
| 2003/0149724 A1* | 8/2003 | Chang | 709/204 |
| 2004/0249907 A1* | 12/2004 | Brubacher et al. | 709/220 |
| 2005/0108757 A1* | 5/2005 | Lee et al. | 725/50 |
| 2006/0143432 A1* | 6/2006 | Rothman et al. | 713/2 |
| 2006/0212537 A1* | 9/2006 | Hans et al. | 709/217 |
| 2006/0245377 A1* | 11/2006 | Jeong et al. | 370/260 |
| 2007/0115948 A1* | 5/2007 | Dasgupta et al. | 370/356 |
| 2010/0205375 A1* | 8/2010 | Challener et al. | 711/118 |

OTHER PUBLICATIONS

"Interwise Connect Video Conferencing, Version 7.2", [online] Slideshare, Inc., 2010, [retrieved May 28, 2010] retrieved from the Internet: <http://www.slideshare.net/Videoguy/video-conferencing-3722285>.

* cited by examiner

Primary Examiner — Jeong S Park
(74) Attorney, Agent, or Firm — Patents on Demand P.A.; Brian K. Buchheit; Scott M. Garrett

(57) ABSTRACT

A real time communication session can be defined in which more than two participants communicate with each other using at least two different types of bidirectional communication. In one embodiment, the different types of bidirectional communication can include audio and video. During communication session, demoting one of the participants can be demoted so that the demoted participant is still a participant of communication session but communicates using at least one less than the two different types. Responsive to the demoting, one of the participants can be promoted so that the promoted participant is permitted to participate in the communication session using at least two different types of bidirectional communication. The promoting would not be permitted due to a system constraint on the real time communication session in absence of the demoting.

16 Claims, 5 Drawing Sheets

DYNAMIC ADJUSTMENT OF USER-RECEIVED COMMUNICATIONS FOR A REAL-TIME MULTIMEDIA COMMUNICATIONS EVENT

BACKGROUND

The present invention relates to the field of multimedia communications and, more particularly, to dynamically adjusting user-received communications for a real-time multimedia communications event.

Real-time multimedia communications events (e.g., video conferences, online collaboration sessions, instant messaging, etc.) have become a key tool for organizations whose workforce is geographically separated. Due to the various constraints on the networks being used to provide the real-time multimedia communication, many real-time multimedia communications systems include functionality that automatically adjust the quality of the communications provided to end-users. Additionally, some real-time multimedia communications systems allow a system administrator to define a maximum number or threshold of participants that are provided with communication types that are more resource consuming like video.

For example, if the organization's local area network (LAN) is under heavy load, the real-time multimedia communications systems may reduce the quality of the video portion or stream provided to the participants of a video conference. In the case where the threshold for video participants has been reached, the next user to join the video conference will be provided with only the audio portion.

While these efforts address resource issues from the network perspective, the creator of the real-time multimedia communications event has no control as to how the real-time multimedia communications systems will appropriate the limited number of higher resource-consuming connections. As such, the later a participant joins the real-time multimedia communications event, the more likely it is that the participant will not receive a higher resource-consuming connection like video.

In a conventional real-time multimedia communications system, attempting to provide a late participant with a full resource connection to the real-time multimedia communications event would require existing participants to leave until the late participant has the desired connection and then rejoin. After this effort, it is still possible that the other participants do not have the type of connections that the event creator desires. This manual process of adjustment consumes the time allowed for the real-time multimedia communications event as well as increases user frustrations.

SUMMARY

One aspect of the present invention can include a method, computer program product, system, and/or apparatus (e.g., device) for dynamically adjusting communication types within a communication session. In the aspect, a real time communication session can be defined that has more than two communication participants. The real time communication session can utilize at least two distinct communication types that include audio and video. The real time communication session can have an upper audio threshold of N representing a maximum number of the communication session participants that receive a bidirectional audio channel of the communication session. The real time communication session can have an upper video threshold of M representing a maximum number of communication session participants that receive a bidirectional video channel. N and M can be integers greater than two, where M is greater than N. When the number of session participants utilizing the audio channel and the video channel is M, a request for adding at least one additional session participant to the communication session can be received. Responsive to the adding, at least one of the M session participants can be demoting from participating within the communication session via both the audio channel and the video channel so that the one session participant communicates within the communication session through the audio channel only. Responsive to the demoting, the additional session participant can be permitted to join the communication session via both the audio and the video channels.

Another aspect of the present invention can include a method, computer program product, system, and apparatus for dynamically adjusting communication types within a communication session. In the aspect, a real time communication session can be defined in which more than two participants communicate with each other using at least two different types of bidirectional communication. During the communication session, one of the participants can be demoted so that the demoted participant is still a participant of communication session but communicates using at least one less than the two different types. Responsive to the demoting, one of the participants can be promoted so that the promoted participant is permitted to participate in the communication session using at least two different types of bidirectional communication. The promoting would not be permitted due to a system constraint in absence of the demoting.

DETAILED DESCRIPTION

Figure 1:
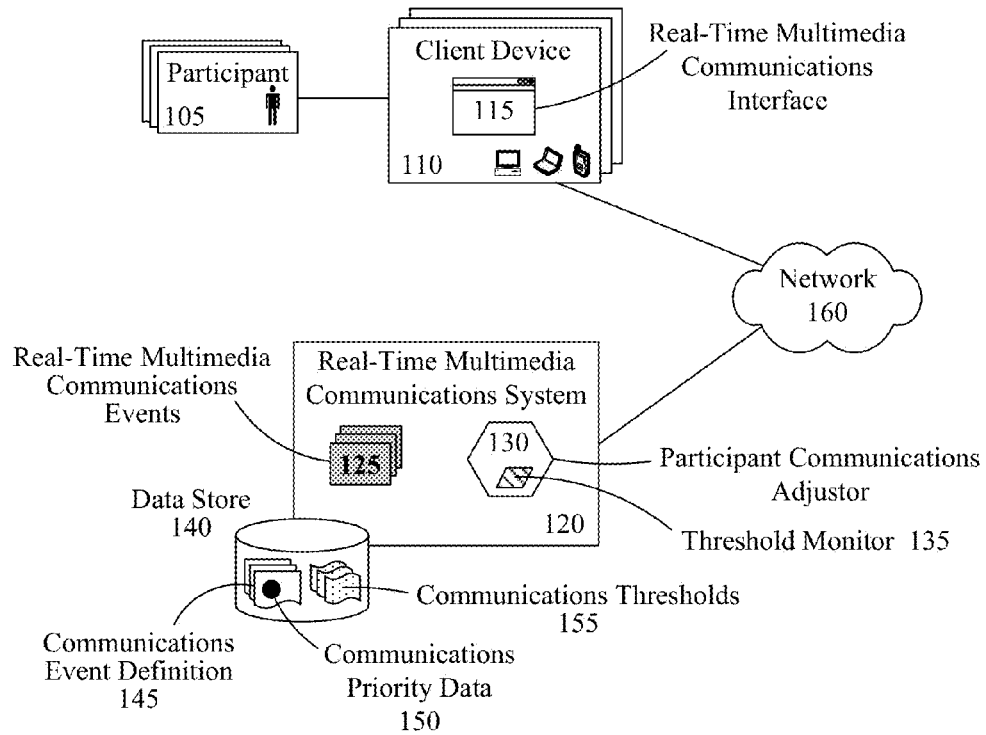
FIG. 1 is a schematic diagram illustrating a system that dynamically adjusts the type of communications received by a participant from the real-time multimedia communications system during a real-time multimedia communications event in accordance with embodiments of the inventive arrangements disclosed herein.

The present invention discloses a solution that dynamically adjusts the communications provided to participants of a real-time multimedia communications event based upon user-configured communications priority data. A participant communications adjustor can utilize the communications priority data when a specific type of communication is to be suspended from one or more participants. The communications priority data can reflect the preferences of the real-time multimedia communications event's creator regarding which participants have priority to receive communications, particularly when the real-time multimedia communications system is operating under resource constraints.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that dynamically adjusts the type of communications received by a participant 105 from the real-time multimedia communications system 120 during a real-time multimedia communications event 125 in accordance with embodiments of the inventive arrangements disclosed herein. In system 100, participants 105 can participate in a real-time multimedia communications event 125 over a network 160 using a real-time multimedia communications interface 115.

The real-time multimedia communications interface 115 can represent a graphical user interface (GUI) in which the participant 105 can be presented with the various types of communications used within the real-time multimedia communications event 125. The real-time multimedia communications interface 115 can operate upon a client device 110 representing a variety of computing devices, such as a desktop computer, a smart phone, a laptop computer, and the like.

The client device 115 can be configured to include the hardware and/or software components necessary for the participant 105 to participate in the real-time multimedia communications event 125. However, the real-time multimedia communications system 120 can allow participation of a client device 110 lacking support for certain types of communications by providing only the supported communications.

For example, the desktop computer 110 of a participant 105 may lack a compatible video card for rendering the video portion of a video conference 125. Thus, the real-time multimedia communications system 120 can allow the participant 105 to join the video conference 125, providing only the audio portion.

The real-time multimedia communications system 120 can represent the hardware and/or software components required to conduct real-time multimedia communications events 125 among participants 105. A real-time multimedia communications system 120 can include the components to support various types of real-time communications. The types of communication provided by the real-time multimedia communications system 120 can include, but are not limited to, audio, video, instant messaging, graphics, data files, collaboration spaces, and the like.

The real-time multimedia communications system 120 can be an inclusive communications system, such as an online collaboration system. Alternately, the real-time multimedia communications system 120 can be a grouping of separate communications systems used together in order to provide the required communications support. For example, an instant messaging system used in conjunction with a video conferencing system.

In another embodiment, the centralization suggested by the real-time multimedia communications system 120 can be embodied by the client device 110 of a participant 105. That is, the client device 110 can include the necessary hardware and/or software components to act as the provider (i.e., server) for the real-time multimedia communications event 125.

Figure 1A:
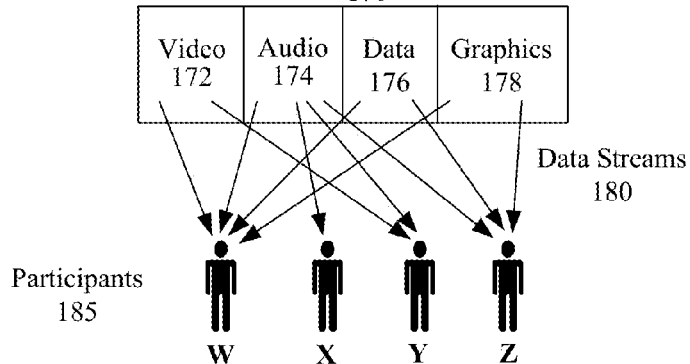
FIG. 1A illustrates an example of communication types provided to participants during a real-time multimedia communications event.

A real-time multimedia communications event 125 can represent a scheduled use of the real-time multimedia communications system's 120 resources, such as a collaboration session, group chat, or video conference. As shown in example 165 of FIG. 1A, a real-time multimedia communications event 170 can be comprised of different communication types 172-178. The real-time multimedia communications event 170 shown in example 165 includes video 172, audio 174, data 176, and graphics 178.

Participants 185 of the real-time multimedia communications event 170 can receive all or some of the data streams 180 for the various communications types 172-178. As shown in example 165, participant W 185 is receiving data streams 180 for video 172, audio 174, data 176, and graphics 178; participant X 185 receives only audio 174; participant Y 185 receives video 172 and audio 174; and participant Z 185 receives audio 174, data 176, and graphics 178.

It should be noted that, in example 165, each communications type 172-178 is shown as a separate data stream 180 for simplicity and illustrative purposes. Implementation of an embodiment of the present invention can utilize data streams 180 in accordance with accepted and supported protocols that contain multiple communications types. For example, a single data stream 180 utilizing the real-time transport protocol (RTP) can transmit audio, video, and data.

The details (e.g., time, date, participant identifiers, etc.) for the real-time multimedia communications event 125 can be entered by an originating participant 105 and saved in a data store 145 as the communications event definition 145. The communications event definition 145 can include communications priority data 150, a subset of user-configurable parameters that define the originating participant's 105 preference for providing different communications types to designated participants 105 of the real-time multimedia communications event 125.

For example, the originating participant 105 can use the communications priority data 150 to indicate that the CEO 105 has a higher priority for receiving the video of a video conference 125 than their Supervisor 105.

In another embodiment, the communications priority data 150 can be stored separate from the communications event definition 145, like a set of general prioritization rules associated with a specific participant 105 for use with real-time multimedia communications events 125 that they have created.

The priority values used in the communications priority data 150 can be expressed in a variety of ways, including, but not limited to, a numbered scale, a textual grouping (i.e., high, medium, low), a logical rules set (i.e., managerial participants 105 have a higher priority than coworker participants 105), and the like.

The values of the communications priority data 150 can be utilized by the participant communications adjustor 130 when determining which participants 105 should or should not receive certain types of communications when the real-time multimedia communications system 120 encounters restrictive operating conditions. Restrictive operating conditions of the real-time multimedia communications system 120 can be expressed as communications thresholds 155.

For example, when the real-time multimedia communications system 120 is experiencing a heavy load, the communications threshold 155 can be three participants 105 for providing video and six participants 105 for providing graphics per real-time multimedia communications event 125.

In some real-time multimedia communications systems 120, the communications thresholds 155 can be dynamically changed by the real-time multimedia communications system 120 based upon the current operating conditions. The communications thresholds 155 can also be manually defined by an administrator of the real-time multimedia communications system 120. The threshold monitor 135 component of the participant communications adjustor 130 can be used to keep track of changes to the communications thresholds 155.

Thus, as the communications thresholds 155 constrict or the number of participants 105 increases, the real-time multimedia communications system 120 can be unable to provide all types of communications to all participants 105. Typically, a real-time multimedia communications system 120 can attempt to lower the quality of communications that require more resources (i.e., network 160 bandwidth) like video. When a reduction in quality is not sufficient, the real-time multimedia communications system 120 may simply cease to provide the more resource-consuming communications. In one embodiment, disabling one or more type of communication (e.g., video, audio, graphics, etc.) can occur without attempting to reduce quality of these resources. Further, a hybrid approach can be implemented, where in certain circumstances (defined for system 120) quality of one or more communications (e.g., data streams 180) can be reduced, in other circumstances, one or more types (e.g., video 172, audio 174, data 176, graphics 178, etc.) of communication can be prevented without rejecting quality, in still other circumstances, a quality of some communication streams can be reduced while one or more communication types to one or more participants 185 are prevented.

Regardless, when the real-time multimedia communications system 120 reaches this point (detects an event 125 that indicates communication streams 180 are to be adjusted), the participant communications adjustor 130 can intervene to terminate communications to the participants 105 in accordance with the communications priority data 150 set by the originating participant 105 of the real-time multimedia communications event 125. That is, communications can be terminated to participants 105 designated with a low priority first. It should be emphasized that terminating communications to the participates 105 can refer to terminating data presented within one channel or modality to that participant 105, while permitting the participant 105 to continue to participate within the communication session. That is, the participant's available interactive modalities have been downgraded, but their participation with the communication session is not terminated in its entirety. In one embodiment, downgrading the interactive modalities to a participant 105 can result in one of multiple and synchronized channels of communication being terminated. In another embodiment, a single channel (or communication stream 180) can provide multiple modalities or types of data (e.g., video 172, audio 174, data 176, graphics 178, etc.), where the channel persists during the session, simply the number of type of data provided over the channel are reduced.

To illustrate by example, if CEO 105 has a higher priority for receiving video than Supervisor 105, then when the communications threshold 155 for video constrains the real-time multimedia communications event 125, the video to Supervisor 105 can be terminated before the video to CEO 105.

It should be noted that the real-time multimedia communications system 120 typically utilize a generic algorithm (i.e., last in, first out) for determining with which participants 105 to terminate communications that does not take into account a preference of the originating participant 105 of the real-time multimedia communications event 125.

The functionality of the participant communications adjustor 130 can also be useful when the real-time multimedia communications system 120 is not experiencing restrictive operating conditions. For example, a subset of participants (105, 185) during a communication session can desire to have a video feed, which other participants not in the subset cannot see. Thus, a participant not in the subset can initially receive video, can have the video downgraded during the session, then can have the video feed (communication session type) upgraded again (once the video feed has been played). This process can occur without the session terminating and while other type of communication (or modalities, excluding video) are continuously available to session participants.

In one embodiment, the real-time multimedia communications systems 120 can have system or administrator defined communications thresholds 155 (i.e., a universal maximum number of video participants). These thresholds 155 can be imposed for cost, service level, resource capability or for any other reason.

As participants 105 join the real-time multimedia communications event 125, the real-time multimedia communications system 120 typically provides each participant 105 with all the designated communications types. However, participants 105 who join the real-time multimedia communications event 125 after a communications threshold 155 has been met can no longer be provided with that specific communications type.

For example, using a video threshold 155 of five for a video conference 125, the first five participants 105 who join the video conference 125 can be provided with the audio and video portions; the sixth and proceeding participants 105 joining the video conference 125 can only be provided with the audio portion.

While this approach is valid, it does not take into account real world situations and preferences. For example, the originating participant 105 is having a video conference 125 to present a new project proposal that requires the approval of Supervisor 105. If Supervisor 150 is not one of the first five people to join the video conference 125, Supervisor 150 will be provided with only audio.

Assume that Supervisor 125 ran late and is receiving only the audio portion of the video conference 125. A conventional real-time multimedia communications system 120 can lack functionality to allow the originating participant 105 to stop providing video to another participant 105 in order to provide Supervisor 105 with the video portion.

However, in system 100, the participant communications adjustor 130 can examine the communications priority data 150 of participants 105 who join after a communications threshold 155 has been met and modify the communications provided to the participants 105 accordingly. This adjustment can be performed automatically and/or via manual input, such as input from the communication originator or other such user possessing appropriate (e.g., elevated) administrative permissions for the communication session.

Using the above example, the participant communications adjustor 130 can compare the video priority data 150 of the five participants 105 receiving video with the video priority data 150 of Supervisor 105. Provided that the originating participant 105 gave Supervisor 105 a high priority value, the participant communications adjustor 130 can demote one of the five participants 105 to only receiving audio to release a video connection that can be given to the Supervisor 105.

Network 160 can include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can also include circuit-based communication components and mobile communication components, such as telephony switches, modems, cellular communication towers, and the like. Network 160 can include line based and/or wireless communication pathways.

As used herein, presented data store 140 can be a physical or virtual storage space configured to store digital information. Data store 140 can be physically implemented within any type of hardware including, but not limited to, a magnetic disk, an optical disk, a semiconductor memory, a digitally encoded plastic memory, a holographic memory, or any other recording medium. Data store 140 can be a stand-alone storage unit as well as a storage unit formed from a plurality of physical devices. Additionally, information can be stored within data store 140 in a variety of manners. For example, information can be stored within a database structure or can be stored within one or more files of a file storage system, where each file may or may not be indexed for information searching purposes. Further, data store 140 can utilize one or more encryption mechanisms to protect stored information from unauthorized access.

Figure 2:
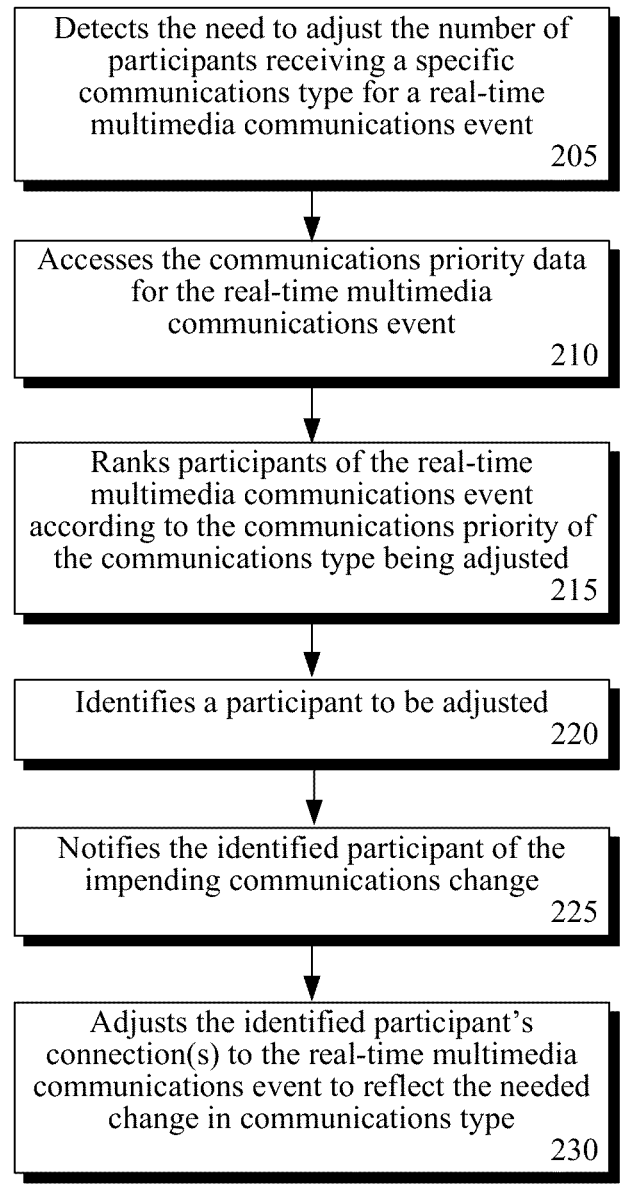
FIG. 2 is a flow chart of a method describing the generic operation of the participant communications adjustor in accordance with an embodiment of the inventive arrangements disclosed herein.

FIG. 2 is a flow chart of a method 200 describing the generic operation of the participant communications adjustor in accordance with embodiments of the inventive arrangements disclosed herein. Method 200 can be performed within the context of system 100 or any other system configured to dynamically adjust the types of communications received during a real-time multimedia communications event in accordance with user-configured communications priority data.

Method 200 can begin in step 205 where the participant communications adjustor can detect the need to adjust the number of participants receiving a specific communications type for a real-time multimedia communications event. The need for adjustment described in step 205 can correspond to a change in a communications threshold of the real-time multimedia communications system or the addition of participants after a communications thresholds has been met. It can also occur responsive to other event, such as an option to establish a communication type to a subset of the participants during a communication session that utilizes multiple different communication types (e.g., a multi-modal communication session).

The communications priority data for the real-time multimedia communications event can then be accessed in step 210. In step 215, the participants of the real-time multimedia communications event can be ranked according to their priority of the communications type being adjusted (i.e., rank by data priority when data is being adjusted).

A participant can be identified for adjustment in step 220. Identification of a participant for adjustment can utilize a variety of methods supported by the participant communications adjustor and the type of adjustment being performed.

In step 225, the identified participant can be notified in regards to the impending communications change. The identified participant's connection(s) to the real-time multimedia communications event can be adjusted to reflect the needed change in communications type.

It should be appreciated that the changes made by the participant communications adjustor occur in real-time as the real-time multimedia communications event is conducted by real-time multimedia communications system.

Figure 3:
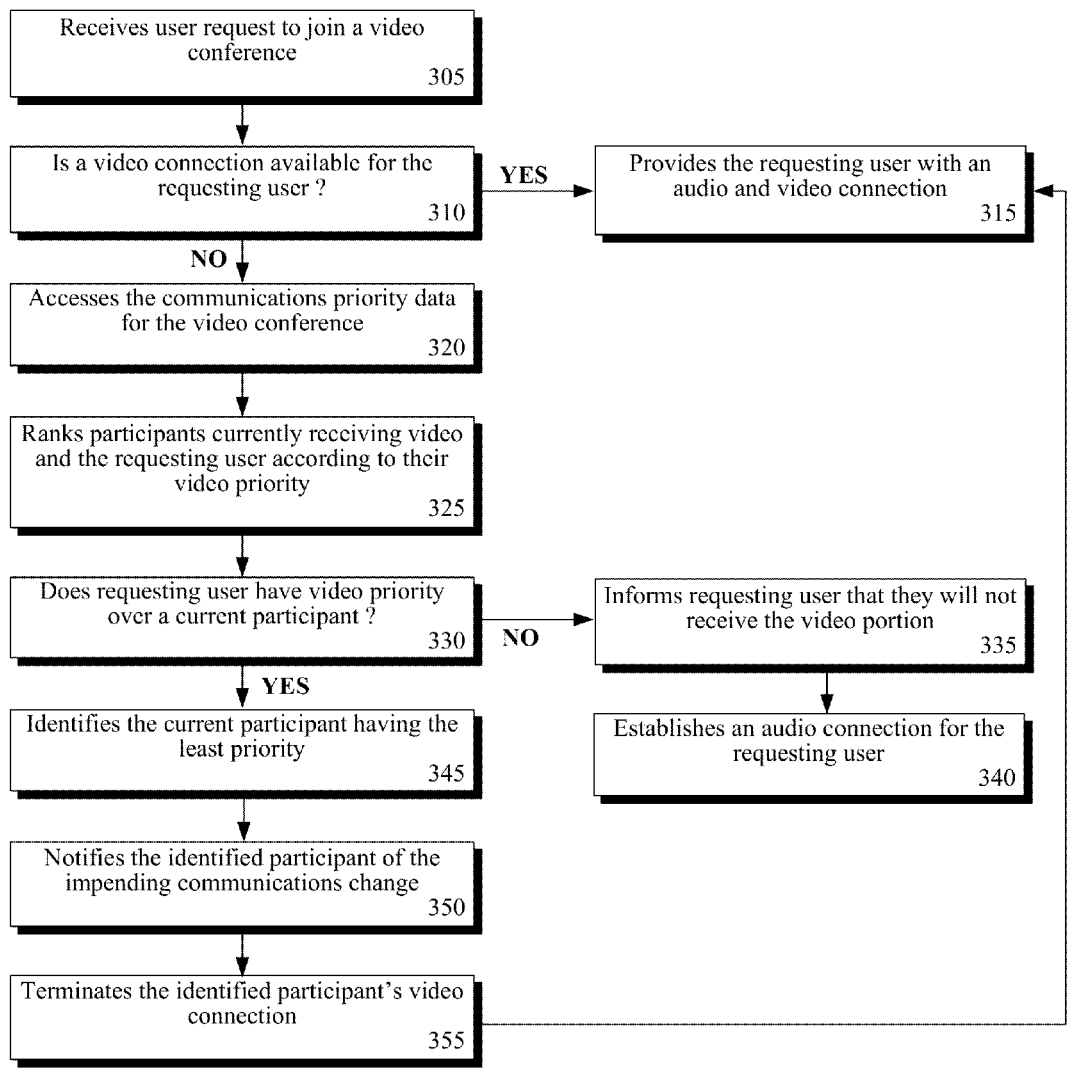
FIG. 3 is a flow chart of a method describing the handling of new users to a video conference by the participant communications adjustor in accordance with an embodiment of the inventive arrangements disclosed herein.

FIG. 3 is a flow chart of a method 300 describing the handling of new users to a video conference by the participant communications adjustor in accordance with embodiments of the inventive arrangements disclosed herein. Method 300 can be performed within the context of system 100 and/or can represent a specific example of method 200.

Method 300 can begin in step 305 where the participant communications adjustor can receive a user request to join a video conference. In step 310, it can be determined if a video connection is available for the requesting user.

When a video connection is available, the requesting user can be provided with an audio and video connection in step 315. When a video connection is not available, as in the case when a communications threshold has been met, step 320 can be performed where the participant communications adjustor can access the communications priority data for the video conference.

The participants who are currently receiving video and the requesting user can then be ranked according to their video priority in step 325. In step 330, it can be determined if the requesting user has priority over a current participant for video. When the requesting user does not have priority, the requesting user can be informed that they will not receive the video portion of the video conference in step 335. In step 340, an audio connection to the video conference can be established for the requesting user.

When the requesting user has priority, step 345 can execute where the participant communications adjustor can determine the participant currently receiving video who has the least priority. The identified participant can be notified of the impending change in communications in step 350.

In step 355, the video connection of the identified participant can be terminated, leaving the identified participant with only audio. It should be noted that performance of step 355 can assume different forms depending upon the implementation of the real-time multimedia communications system (i.e., terminating transmission of a video data stream, not including video data in a multimedia data stream).

Upon completion of step 355, flow of method 300 can proceed to step 315 where the requesting user can be provided with an audio and video connection to the video conference.

Figure 4:
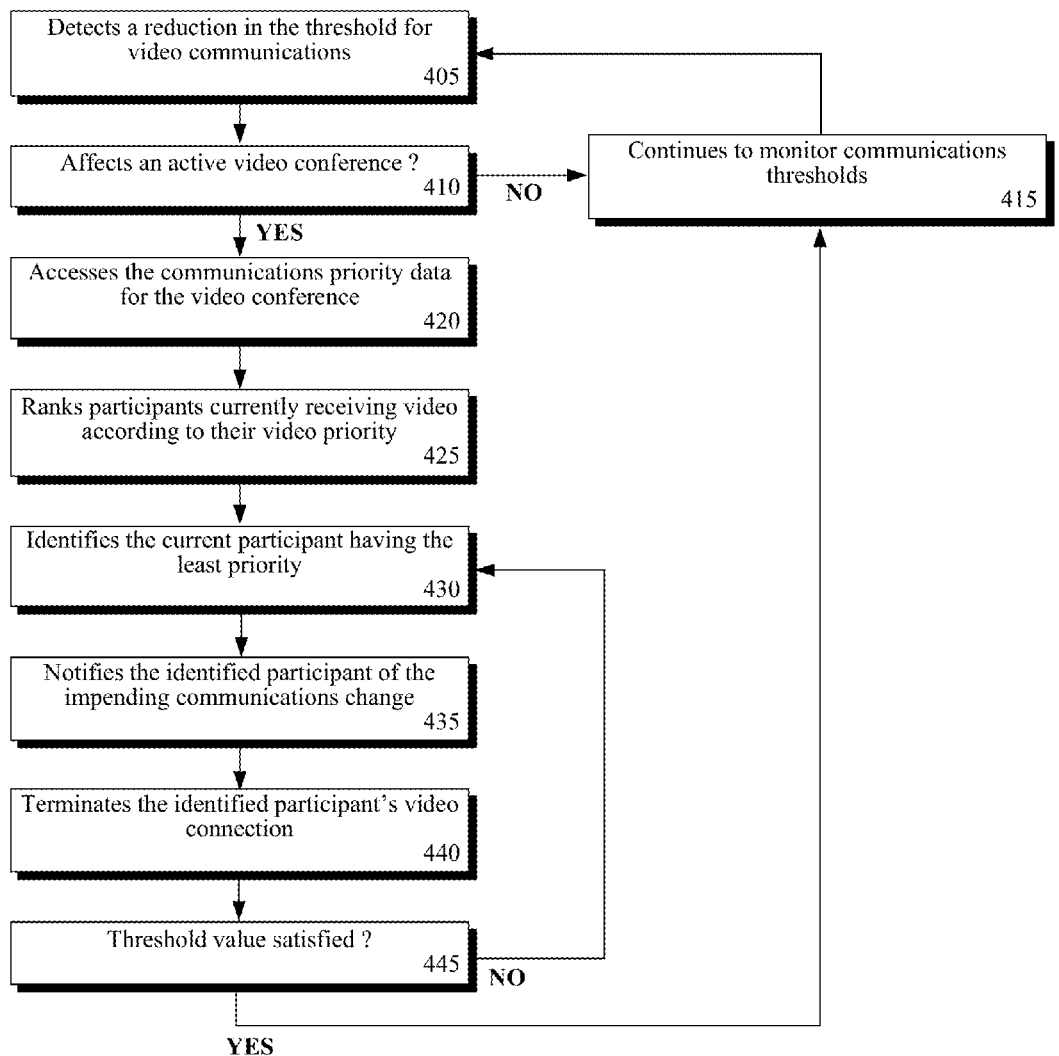
FIG. 4 is a flow chart of a method describing the operation of the participant communications adjustor when the video communications threshold is reduced in accordance with an embodiment of the inventive arrangements disclosed herein.

FIG. 4 is a flow chart of a method 400 describing the operation of the participant communications adjustor when the video communications threshold is reduced in accordance with embodiments of the inventive arrangements disclosed herein. Method 400 can be performed within the context of system 100 and/or can represent a specific example of method 200.

Method 400 can begin in step 405 where the participant communications adjustor can detect a reduction in the video communications threshold. The reduction can be a result of increased system load, network instability, and/or participation. In step 410, it can be determined if the detected reduction affects an active video conference.

When the reduction does not affect an active video conference, the participant communications adjustor can continue to monitor the communications thresholds in step 415. From step 415, flow can return to step 405 to restart method 400.

When the reduction affects an active video conference, step 420 can be performed where the communications priority data for the video conference can be accessed. The participants currently receiving video can then be ranked according to their video priority in step 425.

In step 430, the current participant having the least priority can be identified. The identified participant can be notified of the impending communications change in step 435. In step 440, the identified participant's video connection can be terminated.

In step 445, it can be determined if the threshold value has been satisfied. When the threshold value is not satisfied, flow can return to step 430 to restart selection and termination of the video connection of another participant. When the threshold value is satisfied, the participant communications adjustor can continue to monitor the communications thresholds in step 415.

Figure 5:
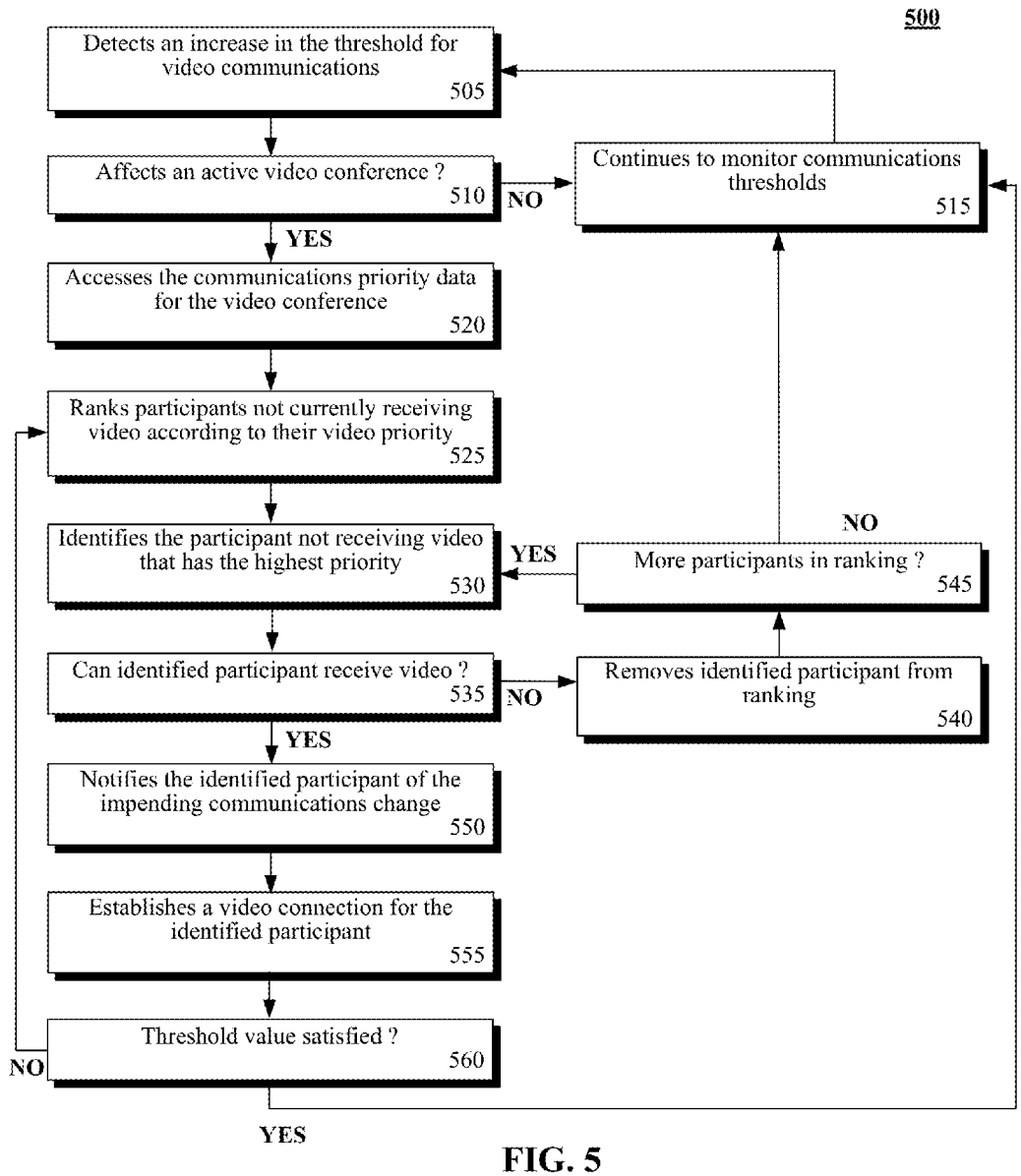
FIG. 5 is a flow chart of a method describing the operation of the participant communications adjustor when the video communications threshold is increased in accordance with an embodiment of the inventive arrangements disclosed herein.

FIG. 5 is a flow chart of a method 500 describing the operation of the participant communications adjustor when the video communications threshold is increased in accordance with embodiments of the inventive arrangements disclosed herein. Method 500 can be performed within the context of system 100 and/or can represent a specific example of method 200.

Method 500 can begin in step 505 where the participant communications adjustor can detect an increase in the video communications threshold. The increase can be a result of decreased system load, network instability, and/or participation. In step 510, it can be determined if the detected increase affects an active video conference.

When the increase does not affect an active video conference, the participant communications adjustor can continue to monitor the communications thresholds in step 515. From step 515, flow can return to step 505 to restart method 500.

When the increase affects an active video conference, step 520 can be performed where the communications priority data for the video conference can be accessed. The participants not currently receiving video can then be ranked according to their video priority in step 525.

In step 530, the current participant having the highest priority can be identified. In step 535, it can be determined if the identified participant can receive video. When the identified participant cannot receive video, the identified participant can be removed from the ranking in step 540.

In step 545, the existence of more participants in the ranking can be determined. When no other participants exist, flow can proceed to step 515 where the participant communications adjustor can continue to monitor the communications thresholds. When more participants exist, flow can return to step 530 to select another participant.

When the identified participant can receive video, step 550 can execute where the identified participant can be notified of the impending communications change. A video connection can then be established for the identified participant in step 555.

In step 560, it can be determined if the threshold value has been satisfied. When the threshold value is not satisfied, flow can return to step 525 to restart selection of another participant. When the threshold value is satisfied, the participant communications adjustor can continue to monitor the communications thresholds in step 515.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising a non-transitory computer readable storage medium having computer usable program code embodied therewith, the computer usable program code comprising:

computer usable program code stored in a non-transitory tangible storage medium, when said computer usable program code is executed by a processor it is operable to define a real time communication session having more than two communication participants, wherein the real time communication session comprises at least two distinct communication types that include audio and video, wherein said real time communication session has an upper audio threshold of N representing a maximum number of the communication session participants that receive a bidirectional audio channel of the communication session, wherein said real time communication session has an upper video threshold of M representing a maximum number of communication session participants that receive a bidirectional video channel, wherein N and M are integers greater than two;

computer usable program code stored in a non-transitory tangible storage medium, when said computer usable program code is executed by a processor it is operable to, while the number of session participants utilizing the audio channel and the video channel is M, add at least one additional session participant to the communication session;

computer usable program code stored in a non-transitory tangible storage medium, when said computer usable program code is executed by a processor it is operable to, responsive to the adding, demote at least one of the M session participants from participating within the communication session via both the audio channel and the video channel so that the one session participant communicates within the communication session through the audio channel only;

computer usable program code stored in a non-transitory tangible storage medium, when said computer usable program code is executed by a processor it is operable to, responsive to the demoting, permit the additional session participant to join the communication session via both the audio and the video channels; and comprising computer usable program code stored in a non-transitory tangible storage medium, when said computer usable program code is executed by a processor it is operable to determine computing resources available for the real-time communication session; automatically change the values of N and M responsive to a determined change in the computing resources available; and demote at least one session participant responsive to the automatic change of the value of M.

2. The computer program product of claim 1, wherein the real time communication session comprises a communication event definition.

3. The computer program product of claim 2, wherein the communication event definition comprises communications priority data and a subset of user-configurable parameters.

4. The computer program product of claim 3, wherein the subset of user-configurable parameters define an originating participant's preference for providing different communications types to designated participants of the real-time multimedia communications event.

5. The computer program product of claim 3, wherein the communications priority data is stored separate from the communications event definition.

6. The computer program product of claim 3, wherein the communications priority data comprises at least one of a numbered scale, a textual grouping and a set of logical rules.

7. A system for dynamically adjusting communication types within a communication session comprising:

a real time communication system comprising hardware and software executable on the hardware, where said software is digitally encoded on a non-transitory tangible storage medium, said real time communication system being operable to provide real-time communication sessions to more than two participants that are able to communicate with each other using at least two different types of bidirectional communication, wherein at least two different types of bidirectional communication handled by the real time communication system comprise audio and video, wherein one of the different constraints of the threshold monitor is an upper audio threshold of N representing a maximum number of the communication session participants that receive a bidirectional audio channel of the communication session, wherein another of the different constraints of the threshold monitor is an upper video threshold of M representing a maximum number of communication session participants that receive a bidirectional video channel, wherein N and M are integers greater than two;

a threshold monitor implemented within software stored on a non-transitory tangible storage medium and executable by a processor, which when executed is operable to establish and enforce constraints on a number of concurrent participants able to participate in each communication session, wherein different constraints and numbers are established for each of the at least two different types of bidirectional communication, wherein the threshold monitor is configured to:

determine computing resources available for the real-time communications session;

automatically change the values of N and M responsive to a determined change in the computing resources available; and demote at least one session participant responsive to the automatic change of the value of M; and a participant communication adjustor implemented within software stored on a non-transitory tangible storage medium and executable by a processor, which when executed is operable to promote and demote communication session participants, wherein each demoted communication session participant is still a participant of communication session but communicates using at least one less than the two different types, and wherein each promoted communication session participant is permitted to participate in the communication session using at least two different types of bidirectional communication, wherein at least a portion of the times the participant communication adjustor demotes a participant is to enable a different communication participant to be promoted, which would not be otherwise permitted due to a system constraint handled by the threshold monitor.

8. The system of claim 7, wherein each of the different types of bidirectional communication comprise one of audio, video, data, graphics, and text exchange.

9. The system of claim 7, wherein the two different types of bidirectional communication provided by the real time communication system during one of the communication sessions are each distinct communication pathways utilizing different protocols, wherein the distinct communication pathways are synchronized with each other.

10. The system of claim 7, wherein the two different types of bidirectional communication provided by the real time communication system during one of the communication sessions are provided over the same communication pathway utilizing a single protocol that handles both of the two different types of bidirectional communication.

11. The system of claim 7, wherein the real time communication session comprises a communication event definition.

12. The system of claim 11, wherein the communication event definition comprises communications priority data and a subset of user-configurable parameters.

13. The system of claim 12, wherein the subset of user-configurable parameters define an originating participant's preference for providing different communications types to designated participants of the real-time multimedia communications event.

14. The system of claim 12, wherein the communications priority data is stored separate from the communications event definition.

15. The system of claim 12, wherein the communications priority data comprises at least one of a numbered scale, a textual grouping and a set of logical rules.

16. The system of claim 12, wherein the participant communication adjustor ranks the communication participants based on the communication priority data.

* * * * *